United States Patent
Hansen

(10) Patent No.: US 10,371,187 B2
(45) Date of Patent: Aug. 6, 2019

(54) LOCKING DEVICE FOR TELESCOPABLE FURNITURE COLUMN

(71) Applicant: Kesseböhmer Produktions GmbH & Co. KG, Weilheim/Teck (DE)

(72) Inventor: Melf Hansen, Gondelsheim (DE)

(73) Assignee: KESSEBÖHMER PRODUKTIONS GMBH & CO. KG, Weilheim/Teck (DE)

( * ) Notice: Subject to any disclaimer, the term of this patent is extended or adjusted under 35 U.S.C. 154(b) by 0 days.

(21) Appl. No.: 14/888,571

(22) PCT Filed: May 3, 2013

(86) PCT No.: PCT/EP2013/059289
§ 371 (c)(1),
(2) Date: Nov. 2, 2015

(87) PCT Pub. No.: WO2014/177229
PCT Pub. Date: Nov. 6, 2014

(65) Prior Publication Data
US 2016/0061241 A1    Mar. 3, 2016

(51) Int. Cl.
*A47B 9/06* (2006.01)
*F16B 7/10* (2006.01)
(Continued)

(52) U.S. Cl.
CPC .............. *F16B 7/105* (2013.01); *A47B 9/06* (2013.01); *A47B 9/20* (2013.01); *F16M 11/26* (2013.01)

(58) Field of Classification Search
CPC ....... F16M 11/26; F16B 7/105; F16B 21/165; F16B 7/10; A47B 9/06; A47B 9/20;
(Continued)

(56) References Cited

U.S. PATENT DOCUMENTS

| | | | | | |
|---|---|---|---|---|---|
| 1,243,508 | A | * | 10/1917 | Gorton | ...................... A47B 9/20 108/147.19 |
| 3,854,428 | A | * | 12/1974 | Fullenkamp | ............. A47B 9/00 108/136 |

(Continued)

FOREIGN PATENT DOCUMENTS

| DE | 20020870 U1 | 2/2001 |
|---|---|---|
| DE | 10 2009 055 812 A1 | 5/2011 |

(Continued)

OTHER PUBLICATIONS

International Preliminary Report on Patentability (including Written Opinion of the International Searching Authority) for priority application PCT/EP2013/059289, dated Nov. 12, 2015.
(Continued)

*Primary Examiner* — Daniel J Troy
*Assistant Examiner* — Timothy M Ayres
(74) *Attorney, Agent, or Firm* — Hassan Abbas Shakir; Shakir Law PLLC

(57) ABSTRACT

A locking device for a height-adjustable furniture column includes a switching lever, an actuating element, an engaging element having a plurality of locking recesses, and a slide, in which an engaging means is guided. An item of furniture includes the locking device. A method for adjusting the height of the furniture item.

21 Claims, 8 Drawing Sheets

(51) Int. Cl.
*A47B 9/20* (2006.01)
*F16M 11/26* (2006.01)

(58) Field of Classification Search
CPC ........... A47B 9/14; A47B 9/00; A47B 23/046;
A47B 2009/145; A45C 2013/267
USPC ...................... 108/147.21, 146; 182/204, 205
See application file for complete search history.

(56) References Cited

U.S. PATENT DOCUMENTS

| | | | | |
|---|---|---|---|---|
| 4,807,720 | A | * | 2/1989 | Kim .......................... E06C 7/44 |
| | | | | 182/205 |
| 5,335,754 | A | * | 8/1994 | Gibson ..................... E06C 7/44 |
| | | | | 182/204 |
| 5,584,097 | A | * | 12/1996 | Lu ............................ A45C 5/14 |
| | | | | 16/113.1 |
| 5,598,788 | A | | 2/1997 | Jonker |
| 5,628,088 | A | * | 5/1997 | Chen ..................... A45C 13/262 |
| | | | | 16/113.1 |
| 6,209,840 | B1 | * | 4/2001 | Chen ........................ A47C 1/03 |
| | | | | 248/118 |
| 6,299,113 | B1 | | 10/2001 | Yamashita et al. |
| 6,336,680 | B1 | * | 1/2002 | Lee .......................... A47C 1/03 |
| | | | | 297/411.36 |
| 8,128,172 | B2 | * | 3/2012 | Tsai ......................... A47C 1/03 |
| | | | | 297/411.36 |
| 8,251,453 | B2 | * | 8/2012 | Chen ........................ A47C 1/03 |
| | | | | 297/411.36 |
| 9,044,093 | B1 | * | 6/2015 | Pan .......................... A47C 1/03 |
| 2009/0096271 | A1 | | 4/2009 | Tsai |
| 2011/0248542 | A1 | | 10/2011 | Tsai |

FOREIGN PATENT DOCUMENTS

| | | |
|---|---|---|
| DE | 102009055812 A1 | 5/2011 |
| EP | 1013195 A2 | 6/2000 |
| EP | 1400188 A1 | 3/2004 |
| FR | 133470 A1 | 8/1963 |
| FR | 1334701 A | 8/1963 |

OTHER PUBLICATIONS

International Search Report dated Jul. 22, 2013, from corresponding International Application No. PCT/EP2013/059289.
Written Opinion of the International Searching Authority dated Jul. 22, 2013, from corresponding International Application No. PCT/EP2013/059289.

* cited by examiner

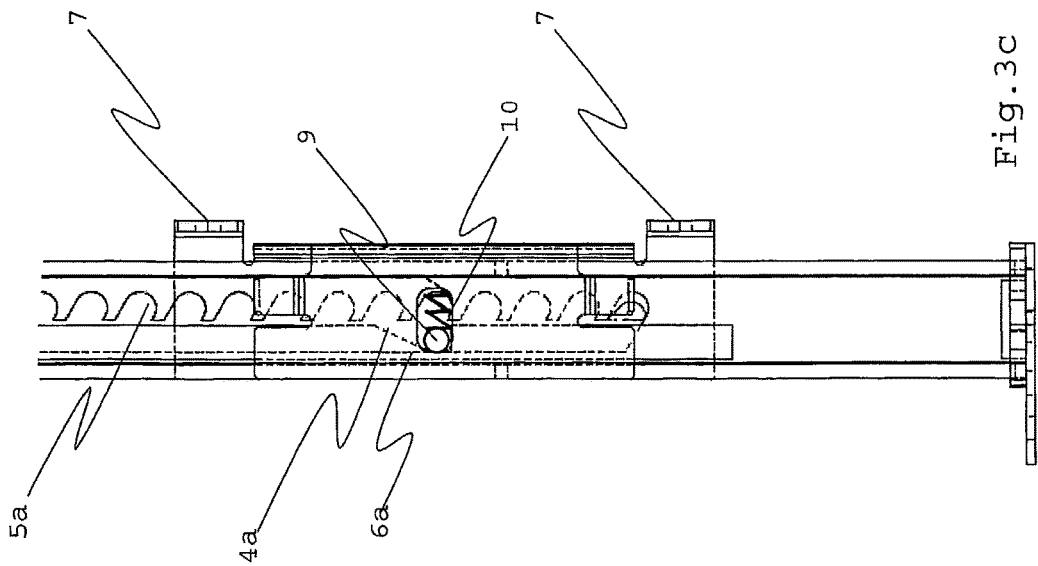
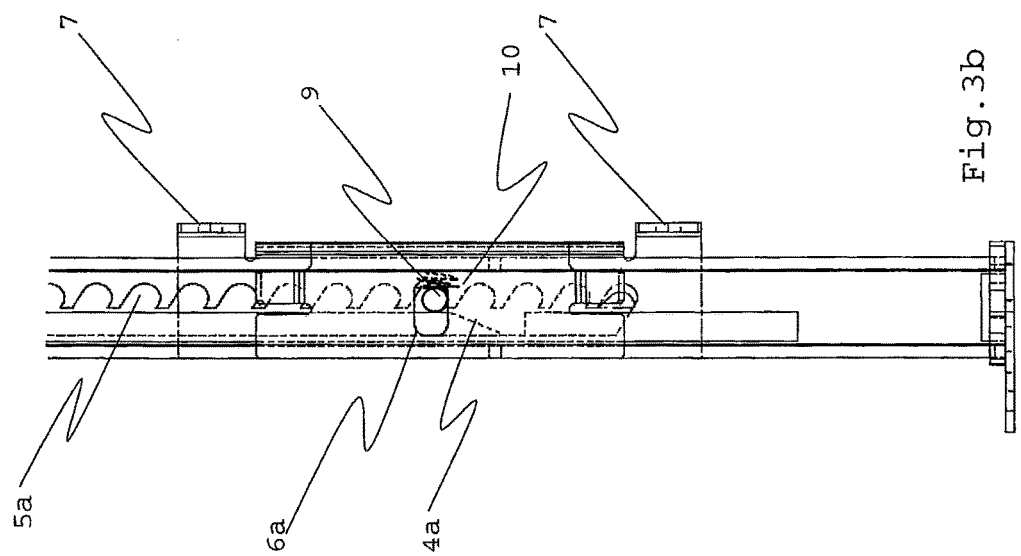

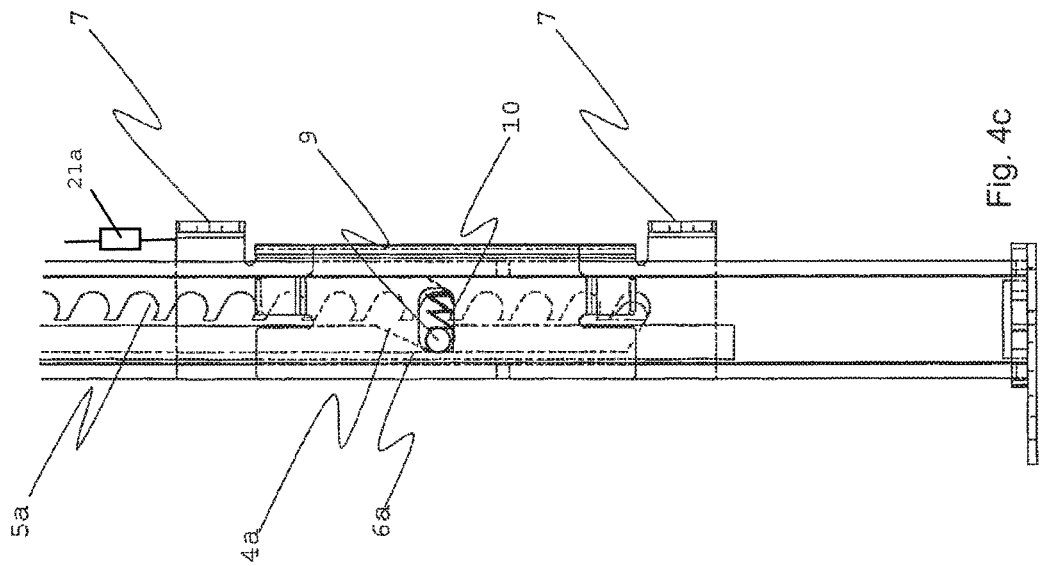
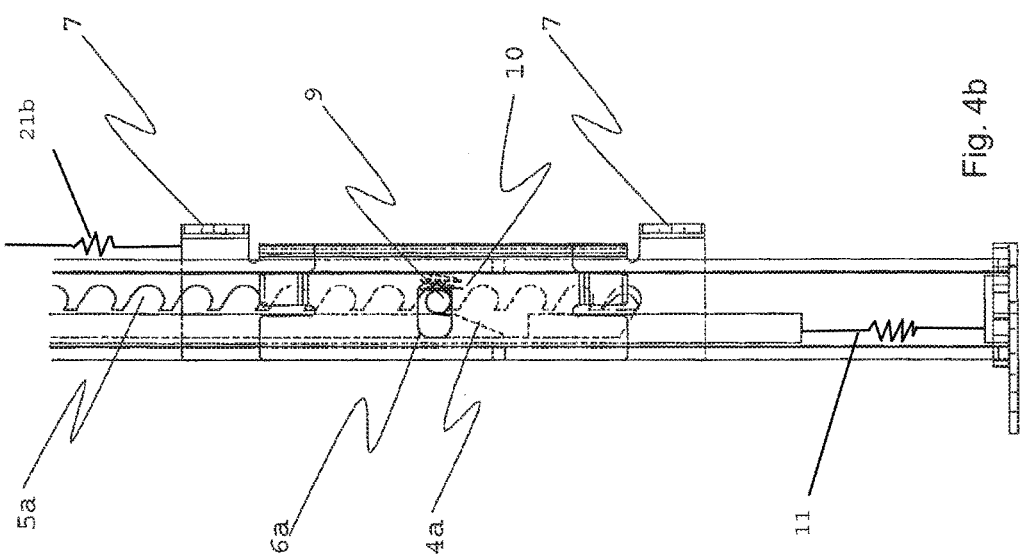

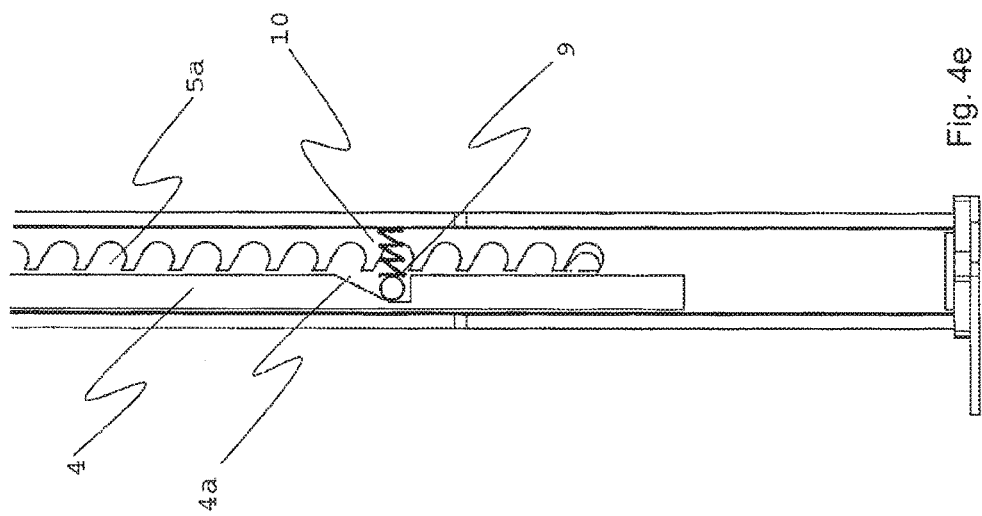
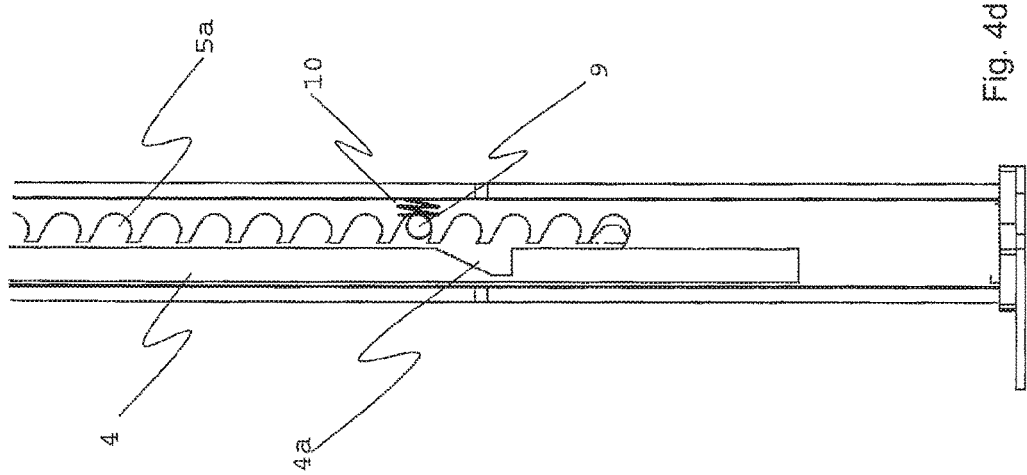

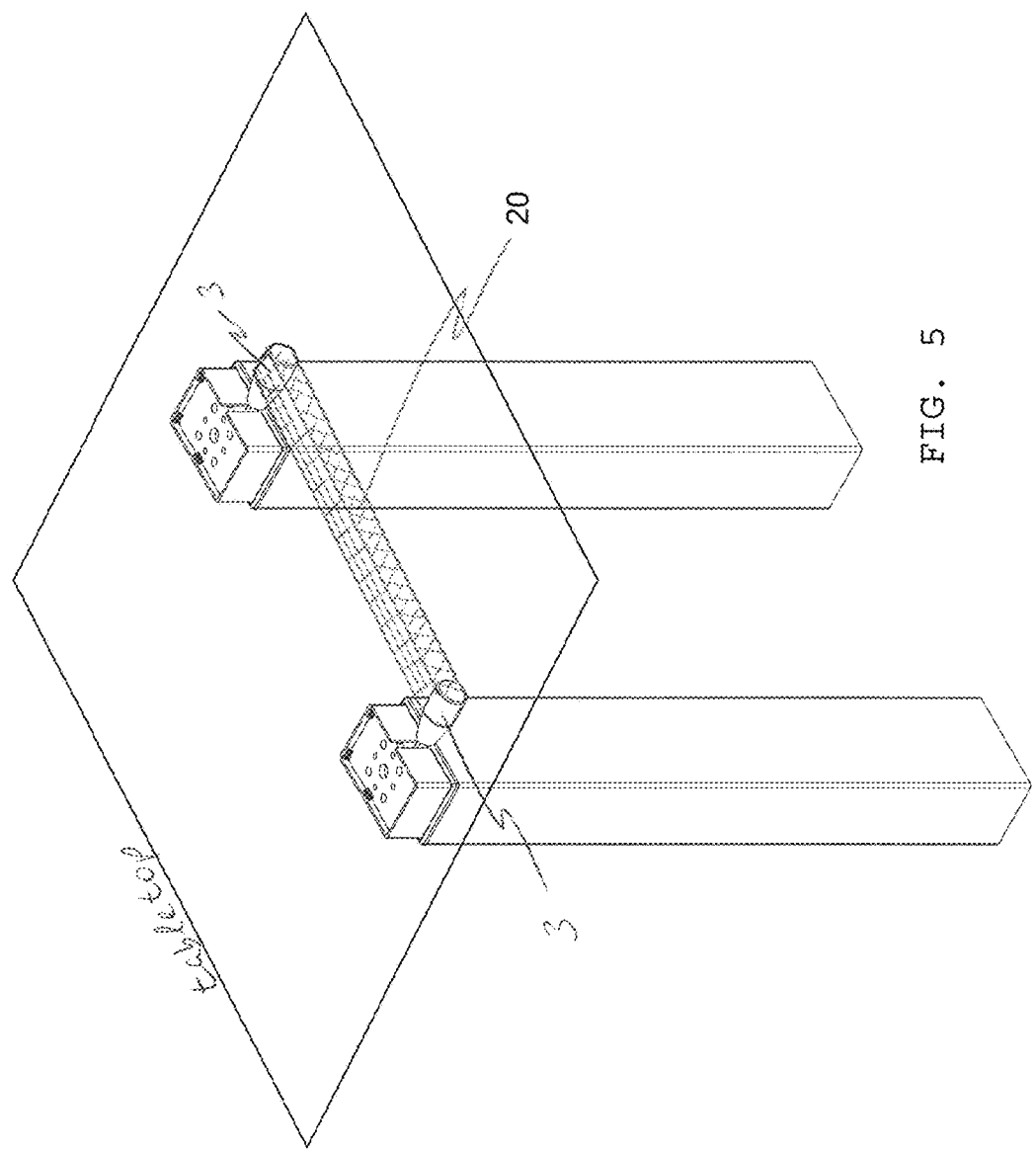

LOCKING DEVICE FOR TELESCOPABLE FURNITURE COLUMN

BACKGROUND OF THE INVENTION

1. Field of the Inventions

The present invention relates to height-adjustable columns for furniture, in particular tables.

2. Discussion of the Related Art

An optimized height adjustment of an office table, for example, is among the essential requirements for the manufacturer, in order to allow the user to work ergonomically. Therefore, table legs are provided, which allow adjusting the table height based on individual needs.

The height-adjustable table legs are known to be made of a multi-part column, e.g., a three-part or two-part column, the latter consisting of an inner column and an outer column, which are of telescopic design and may be retracted or extended. The outer column may be tightly connected to a base and forms a static unit. The inner column may be connected to the table plate, thereby forming a movable portion of the item of furniture. Typically, drives, which may be operated manually or by electric motor, are disposed within the telescopic column.

Before the actual height adjustment of the furniture column, typically a securing means needs to be operated. Placing heavy objects on the item of furniture or removing heavy objects from the item of furniture are prevented from resulting in an undesired height adjustment of the furniture column by said securing means. However, since said height-adjustable items of furniture, in particular tables, sometimes need to carry heavy loads, it is possible that, even when unsecuring the securing means, a sudden drop of the movable portion of the height-adjustable table may occur, possibly resulting in damage to the table or the objects placed thereon or, more importantly, causing injury to the user.

SUMMARY OF THE INVENTION

It is therefore an object of the present invention to provide height-adjustable furniture columns, in particular for desks, in which the above-mentioned hazards can be prevented by a suitable locking device, and in particular to allow the locking device to automatically reengage in case of an accidental release of the table plate during the height adjustment, whereby an undesired drop of the movable portion of the item of furniture is prevented.

The locking device according to the invention allows a height adjustment of the furniture column only if, in a first step, a corresponding actuating element is actuated, resulting in an unlocking of the locking device, and, in a second step, the movable portion of the table plate is relieved by the user, for example by slightly raising the table, whereby the locking device is unsecured. After these two steps are carried out, the engaging means according to the invention may disengage from an engaging element by means of a resilient element, and a height adjustment of the table is possible.

A height-adjustable telescopic column having an inner column and an outer column is provided, wherein, preferably, a locking device is provided within at least one inner column.

This locking device may be provided forming a separate assembly within the column and, in this case, is coupled to the inner column via at least one connection point. However, it is also conceivable that a part of at least one of the furniture columns, such as the inner column, functions as an element of the locking device.

The locking device is appropriately actuated via an actuating element, for example by an operating handle or a push-button, which may be arranged directly at the locking device.

It is also conceivable that the actuator is provided on the table plate or on the table frame, wherein the locking device can, for example, be actuated using a cable mechanism such as a Bowden cable.

In a table having multiple furniture columns, the locking device may be provided in one furniture column only.

However, it is also possible that the locking device is provided in a plurality of furniture columns, wherein, in this case, the respective devices may be operated via a single common central switch and furthermore may be coupled with each other by means of suitable synchronization means, such as traction bands or a synchronizing shaft, whereby the locking and unlocking of the devices can occur synchronously.

Moreover, a direct locking at the respective synchronization element (such as the shaft or the traction bands) may be allowed by suitably coupling the locking device—which can also be provided separately or in isolation from the furniture column—to the synchronization device.

To unsecure the locking device a prior removal of the load of the table's weight is necessary. This can be performed manually after unlocking the locking device, that is, for example, by slightly raising the table plate.

In particularly heavily loaded tables it is possible, however, to provide, inside or outside of the furniture column, at least one gas pressure spring or an extension or compression spring at the corresponding point, which pushes or pulls against the table weight and may assist in removing the load of the table weight after the locking device is unlocked.

BRIEF DESCRIPTION OF THE FIGURES

The invention will be explained in more detail below with reference to the embodiment shown in the drawings. In the drawings:

FIG. 4b is an enlarged view of the locking device according to the invention in a locked position;

FIG. 4c is an enlarged view of the locking device according to the invention in an unlocked position;

FIG. 4d is an enlarged detailed view of the locking device according to the invention in a locked position.

FIG. 4e is an enlarged detailed view of the locking device according to the invention in an unlocked position.

FIG. 5 is an isometric view of a single common central 20 in accordance with one or more embodiments of the present invention.

DETAILED DESCRIPTION OF THE INVENTION

Figure 1:
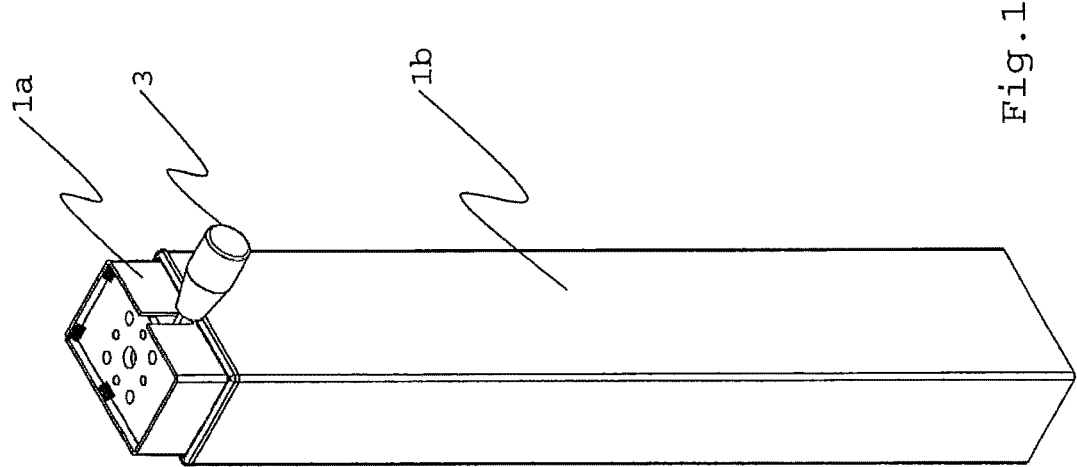
FIG. 1 is a perspective view of a two-part height-adjustable telescopic column according to the invention.

FIG. 1 shows a two-part adjustable telescopic column consisting of an inner column 1a and an outer column 1b.

The inner column 1a has an end plate on its top, to which a table plate can be mounted. Additionally, the inner column 1a is formed open and hollow at the bottom (not shown). The outer column 1b is also hollow and can thereby accommodate the inner column 1a.

In the present exemplary embodiment a locking device is arranged inside the inner column 1a, which has at its upper end an actuating element 3 in the form of an operating handle, which in turn protrudes from an upper end of the inner column 1a.

Figure 2:
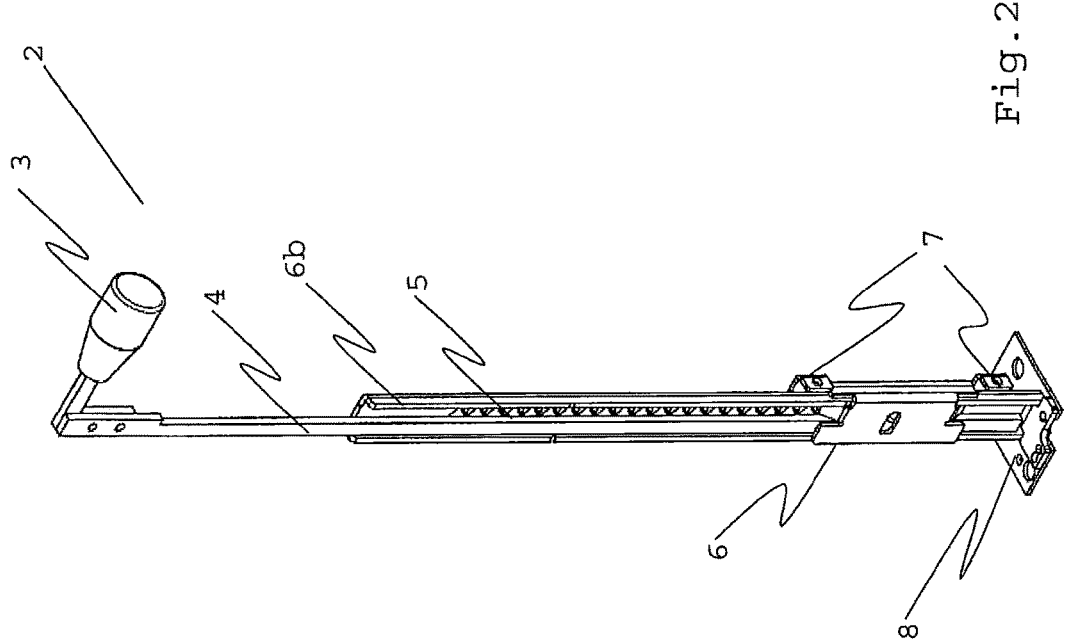
FIG. 2 is a perspective view of a locking device according to the invention.

The locking device itself, shown in FIG. 2, mainly consists of a switching lever 4 with the operating handle 3 formed at the upper end of the switching lever 4. In a preferred embodiment the operating handle faces towards the outer edge of the table.

Moreover, the locking device 2 comprises an engaging element 5 having a plurality of locking recesses. The locking recesses are shown in detail in FIGS. 4b to 4e. The switching lever 4 and the engaging element 5 are partially covered by a slide guide 6b. Additionally, at a lower end of the slide guide 6b, a connection plate 8 is provided for the outer column 1b.

On an opposite side of the slide guide 6b, the locking device 2 includes a slide 6. Furthermore, two connection points 7 for the inner column 1a are arranged at the slide 6. Above these connection points 7 the table weight acts on the slide 6.

Figure 4A:
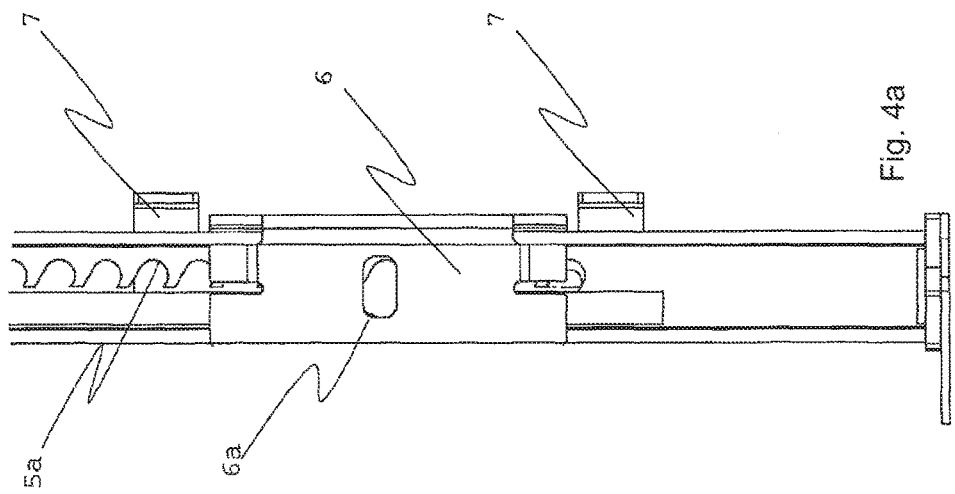
FIG. 4a is an enlarged view of the locking device according to the invention.
Figure 3:
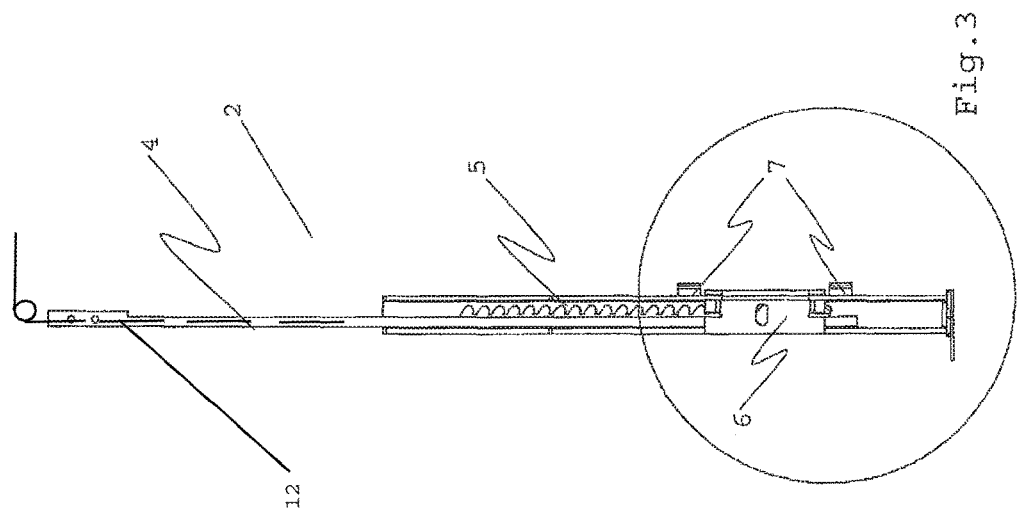
FIG. 3 is a side view of the locking device according to the invention.
Figure 3E:
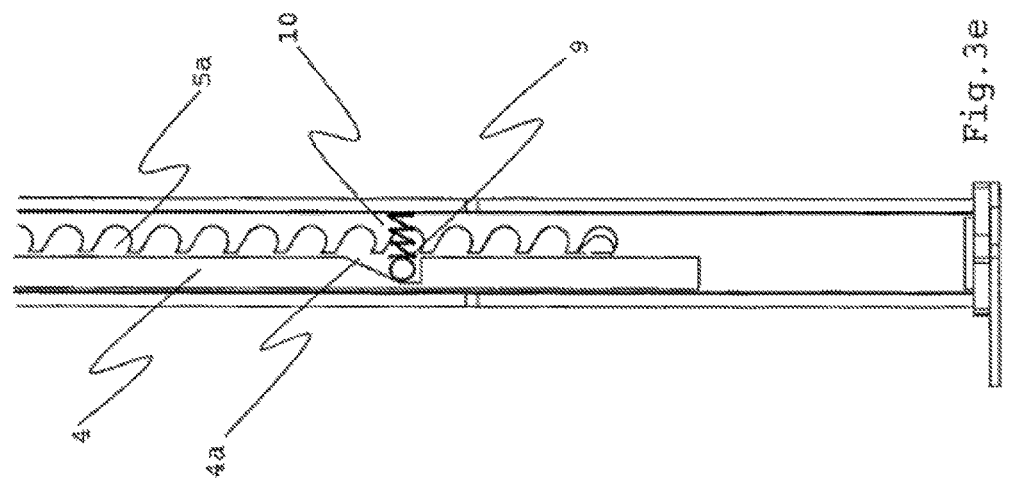
Figure 3D:
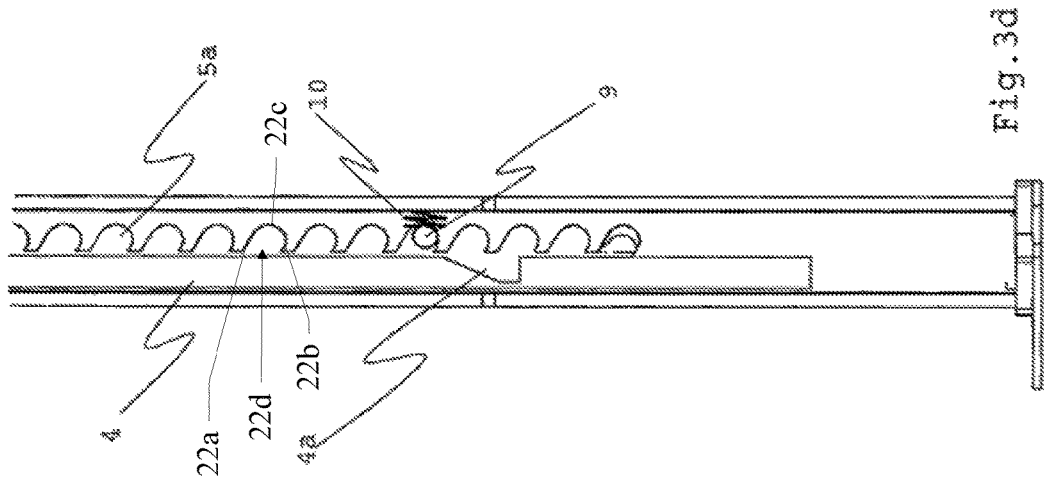

FIG. 4a to FIG. 4e each show a section of the locking device, which is indicated in FIG. 3 by a circle, in an enlarged view. Additionally, FIGS. 4b and 4c show a view, in which the covered edges of the device are indicated by dashed lines. In FIGS. 4d and 4e the corresponding section is illustrated without slide 6 and without slide guide 6b.

As is shown in FIG. 4a, the slide 6 arranged on a front side of the locking device has an opening in the shape of an elongated hole 6a. At the height of the elongated hole 6a, an engaging means is provided, which in this exemplary embodiment is formed as a locking pin 9, as shown in FIG. 4b, and has a centerline (perpendicular to the plane of FIG. 4b). In a locked position of the locking device the locking pin 9 is held in one of the locking recesses 5a. The locking recesses are inclined downwards at a predetermined angle relative to the horizontal. This particular shaping of the locking recesses 5a causes a clamping mechanism between the locking pin 9 and the elongated hole 6a, in which the locking pin 9 is guided.

Each recess of the plurality of recesses comprises a first inclined wall 22a, a second inclined wall 22b, an arcuate portion 22c directly connecting the first inclined wall to the second inclined wall, and a throat 22d disposed distal from the arcuate portion-between a first end of the first inclined wall and a second end of the second inclined wall, a transverse cross-section passing through the first inclined wall, the second inclined wall, the arcuate portion, and the throat. In the transverse cross-section, the first inclined wall is longer than the second inclined wall. The longitudinal centerline of the locking pin is perpendicular to a first plane 26a comprising the elongated hole and perpendicular to a second plane 26b passing perpendicularly through the transverse cross-section of each recess of the plurality of recesses.

As can be seen in FIG. 4b, a spring 10 attempts to urge the locking pin 9 out of the locking recess 5a. It is blocked by the switching lever 4, however. In addition, the table weight over the edges of the elongated hole 6a presses on the locking pin 9.

Now, if the switching lever 4 is actuated in the triggering direction, in this case upwards, this, on its own, does not cause the unsecuring of the device. Only when the load of the table weight is removed, the locking pin 9 may be urged into the cut-out 4a by the spring 10, and the locking device is disengaged. Now, a height adjustment of the furniture column can take place.

If the actuating handle 3 and thereby the switching lever 4 is pushed back down after the height adjustment of the item of furniture, the locking pin 9 is pushed back into the locking recess 5a by the bevelled surface at the cut-out 4a of the switch lever 4. Releasing the table plate results in a load on the locking pin 9, whereby the locking pin engages with the locking recess 5a and the locking device is secured.

In another embodiment it is also possible to provide an additional resilient element 11 at one end of the switching lever 4, which, at the mere release of the operating handle 3, brings the switching lever 4 into a locked position of the locking device. For example, an extension spring may be provided at the lower end of the switching lever, which pulls the switching lever 4 down after releasing the handle 3 and thereby causes the locking pin 9 to return to and engage with a locking recess 5a. Then, releasing the table plate and the load on the slide 6 associated therewith cause the securing of the locking device 5.

It is also conceivable that the actuator is provided on the table plate or on the table frame, wherein the locking device can, for example, be actuated using a cable mechanism 12 such as a Bowden cable.

However, it is also possible that the locking device is provided in a plurality of furniture columns wherein, in this case the respective devices may be operated via a single common central 20 switch and furthermore may be coupled with each other by means of suitable synchronization means, such as traction bands or a synchronizing shaft, whereby the locking and unlocking of the devices can occur synchronously.

In particularly heavily loaded tables it is possible, however, to provide, inside or outside of the furniture column, at least one gas pressure spring 21a or an extension or compression spring 21b at the corresponding point, which pushes or pulls against the table weight and may assist in removing the load of the table weight after the locking device is unlocked.

In addition, even when an accidental release of the table plate occurs, the locking device according to the invention ensures an automatic engagement of the locking pin 9 with the next possible locking recess 5a, whereby an uncontrolled drop of the movable portion of the item of furniture is prevented.

Furthermore, as an alternative to the described two-part column embodiments with a three-part telescopic column are conceivable.

The invention claimed is:

1. A locking device for a multi-stage height-adjustable furniture column, the furniture column having at least one outer column and at least one inner column, the locking device associated with the at least one outer column or the at least one inner column, the outer column for resting on a support surface, the locking device comprising:
   an actuating element;
   a switching lever coupled to the actuating element;
   an engaging element having a plurality of locking recesses, at least one locking recess of the plurality of recesses being inclined downward toward the support surface;
   a locking pin comprising a longitudinal centerline;

a slide comprising an elongated hole, the locking pin being guided in the elongated hole between an unsecured position and a locked position;

a first resilient element for urging the locking pin out of the at least one locking recess;

wherein, when a load is configured to act on the furniture column, the locking pin is guided to the locked position by the at least one locking recess and by the elongated hole; and wherein, when the load is configured to be removed from the furniture column by raising the at least one inner column by a user, the locking pin is guided to the unsecured position by the at least one locking recesses and by the elongated hole;

wherein the longitudinal centerline of the locking pin is perpendicular to a first plane comprising the elongated hole and perpendicular to a second plane passing perpendicularly through a transverse cross-section of each recess of the plurality of recesses;

wherein the longitudinal centerline of the locking pin is perpendicular to a moving direction of the locking pin when moving between the locked position and the unsecured position;

wherein each recess of the plurality of recesses comprises a first inclined wall, a second inclined wall, an arcuate portion directly connecting the first inclined wall to the second inclined wall, and a throat disposed distal from the arcuate portion between a first end of the first inclined wall and a second end of the second inclined wall, the transverse cross-section passing through the first inclined wall, the second inclined wall, the arcuate portion, and the throat.

2. The locking device according to claim 1, wherein the first resilient member is disposed at a height of the elongated hole.

3. The locking device according to claim 1, wherein the switching lever comprises a cut-out, the cut-out for receiving the locking pin in the unsecured position.

4. The locking device according to claim 3, wherein the cut-out has a beveled surface.

5. The locking device according to claim 3, further comprising a second resilient element, the second resilient element being disposed at the switching lever, the resilient element urging the switching lever into the locked position.

6. The locking device according to claim 1, wherein the actuating element is arranged directly at the switching lever.

7. The locking device according to claim 1, further comprising a cable, the cable coupling the actuating element to the switching lever.

8. The locking device of claim 1, wherein the transverse cross-section, the first inclined wall is longer than the second inclined wall.

9. A furniture item comprising:
a first height-adjustable column, the first height-adjustable column having at least one inner column;
a first locking device associated with the first height adjustable column, the first locking device comprising
  an actuating element;
  a switching lever coupled to the actuating element;
  an engaging element having a plurality of locking recesses, at least one locking recess of the plurality of recesses being inclined downward toward the support surface;
  a locking pin comprising a longitudinal centerline;
  a slide comprising an elongated hole, the locking pin being guided in the elongated hole between an unsecured position and a locked position;
  a first resilient element for urging the locking pin out of the at least one locking recess;
  wherein, when a load is acting the first height-adjustable column, the locking pin is guided to the locked position by the at least one locking recess and by the elongated hole; and
  wherein, when the load is removed from the first height-adjustable column by raising the at least one inner column by a user, the locking pin is guided to the unsecured position by the at least one locking recesses and by the elongated hole;
  wherein the longitudinal centerline of the locking pin is perpendicular to a first plane comprising the elongated hole and perpendicular to a second plane passing perpendicularly through a transverse cross-section of each recess of the plurality of recesses;
  wherein the longitudinal centerline of the locking pin is perpendicular to a moving direction of the locking pin when moving between the locked position and the unsecured position;
  wherein each recess of the plurality of recesses comprises a first inclined wall, a second inclined wall, an arcuate portion directly connecting the first inclined wall to the second inclined wall, and a throat disposed distal from the arcuate portion between a first end of the first inclined wall and a second end of the second inclined wall, the transverse cross-section passing through the first inclined wall, the second inclined wall, the arcuate portion, and the throat.

10. The furniture item according to claim 9, wherein the first locking device is disposed within the first height-adjustable column; and
wherein the slide is coupled to the first height-adjustable column via at least one connection point.

11. The furniture item according to claim 9, wherein the locking device is disposed outside of the first height-adjustable column.

12. The furniture item according to claim 9, further comprising
a common central switch;
a second height-adjustable column; and
a second locking device associated with the second height-adjustable column, the second locking device having a construction similar to the first locking device,
wherein the first locking device and the second locking device are actuated via the common central switch.

13. The furniture item according to claim 12,
further comprising a synchronizer;
wherein the first height-adjustable column and the second height-adjustable column are coupled via the synchronizer.

14. The furniture item according to claim 9, further comprising a second resilient element, the second resilient element being associated with the first height-adjustable column, the second resilient element for counteracting a weight disposed on the first height-adjustable column.

15. A method for adjusting the height of a furniture item by a user,
the furniture item comprising
a first height-adjustable column resting on a support surface, the first height-adjustable column comprising at least one inner column;
a table weight; and a locking device associated with the first height adjustable column, the locking device comprising
an actuating element;
a switching lever coupled to the actuating element, the switching lever comprising a cut-out;
an engaging element having a plurality of locking recesses, at least one locking recess of the plurality of recesses being inclined downward toward the support surface;
a locking pin comprising a longitudinal centerline;
a slide comprising an elongated hole, the locking pin being guided in the elongated hole between an unsecured position and a locked position;
a first resilient element for urging the locking pin out of the at least one locking recess;
wherein, when a load is acting on the first height-adjustable column, the locking pin is guided to the locked position by the at least one locking recess and by the elongated hole; and
wherein, when the load is removed from the first height-adjustable column by raising the at least one inner column by a user, the locking pin is guided to the unsecured position by the at least one locking recesses and by the elongated hole;
wherein the longitudinal centerline of the locking pin is perpendicular to a first plane comprising the elongated hole and perpendicular to a second plane passing perpendicularly through the transverse cross-section of each recess of the plurality of recesses;
wherein the longitudinal centerline of the locking pin is perpendicular to a moving direction of the locking pin when moving between the locked position and the unsecured position;
the method comprising the steps of:
(a) removing, by a user, the load from the first height-adjustable column by raising the at least one inner column;
(b) guiding, by the user, the locking pin to the unsecured position by the at least one locking recesses and by the elongated hole;
(c) urging, via the resilient element, the engaging means out of the at least one locking recess and into the cut-out of the switching lever, and
(d) adjusting, by the user, the height of the furniture item;
wherein each recess of the plurality of recesses comprises a first inclined wall, a second inclined wall, an arcuate portion directly connecting the first inclined wall to the second inclined wall, and a throat disposed distal from the arcuate portion between a first end of the first inclined wall and a second end of the second inclined wall, the transverse cross-section passing through the first inclined wall, the second inclined wall, the arcuate portion, and the throat.

16. The method of claim 5, further comprising the steps of:
(d) subsequent to step (c), returning the locking pin from the cut-out into the one locking recess, and
(e) loading the locking device with the table weight to place the locking pin in the locked position.

17. A locking device for a multi-stage height-adjustable furniture column, the furniture column having at least one outer column and at least one inner column, the locking device associated with the at least one outer column or the at least one inner column, the outer column for resting on a support surface, the locking device comprising:
an actuating element;
a switching lever coupled to the actuating element;
an engaging element having a plurality of locking recesses, at least one locking recess of the plurality of recesses being inclined downward toward the support surface;
a locking pin comprising a longitudinal centerline;
a slide comprising an elongated hole, the locking pin being guided in the elongated hole between an unsecured position and a locked position;
a first resilient element for urging the locking pin out of the at least one locking recess;
wherein, when a load is configured to act on the furniture column, the locking pin is guided to the locked position by the at least one locking recess and by the elongated hole; and
wherein, when the load is configured to be removed from the furniture column by raising the at least one inner column by a user, the locking pin is guided to the unsecured position by the at least one locking recesses and by the elongated hole;
wherein the longitudinal centerline of the locking pin is perpendicular to a first plane comprising the elongated hole and perpendicular to a second plane passing perpendicularly through a transverse cross-section of each recess of the plurality of recesses;
wherein the longitudinal centerline of the locking pin is perpendicular to a moving direction of the locking pin when moving between the locked position and the unsecured position;
wherein each recess of the plurality of recesses comprises a first inclined wall, a second inclined wall, an arcuate portion directly connecting the first inclined wall to the second inclined wall, and a throat disposed distal from the arcuate portion between a first end of the first inclined wall and a second end of the second inclined wall, the transverse cross-section passing through the first inclined wall, the second inclined wall, the arcuate portion, and the throat.

18. The locking device according to claim 17, wherein the first resilient member is disposed at a height of the elongated hole.

19. The locking device according to claim 17,
wherein the switching lever comprises a cut-out, the cut-out for receiving the locking pin in the unsecured position.

20. The locking device according to claim 19, wherein the cut-out has a beveled surface.

21. The locking device according to claim 19, further comprising a second resilient element, the second resilient element being disposed at the switching lever, the resilient element urging the switching lever into the locked position.

* * * * *